United States Patent
Jang

(10) Patent No.: US 8,836,757 B2
(45) Date of Patent: Sep. 16, 2014

(54) 3D IMAGE PROVIDING DEVICE, DISPLAY DEVICE, AND METHOD THEREOF

(75) Inventor: Jun-Duk Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 13/379,145

(22) PCT Filed: Feb. 11, 2010

(86) PCT No.: PCT/KR2010/000857

§ 371 (c)(1),
(2), (4) Date: Dec. 19, 2011

(87) PCT Pub. No.: WO2010/150961

PCT Pub. Date: Dec. 29, 2010

(65) Prior Publication Data

US 2012/0092467 A1  Apr. 19, 2012

(51) Int. Cl.
*H04N 13/00* (2006.01)
*H04N 13/02* (2006.01)
*H04N 5/44* (2011.01)
*H04N 9/74* (2006.01)

(52) U.S. Cl.
USPC .............. 348/42; 348/46; 348/51; 348/565; 348/581

(58) Field of Classification Search
CPC ... H04N 13/00; H04N 13/003; H04N 13/004; H04N 13/0048; H04N 13/0055; H04N 13/0059
USPC ............................ 348/42, 46, 51, 565, 581
See application file for complete search history.

(56) References Cited

U.S. PATENT DOCUMENTS

| | | | | |
|---|---|---|---|---|
| 6,285,371 B1 * | 9/2001 | Gould et al. | ................... | 345/422 |
| 7,783,094 B2 * | 8/2010 | Collins et al. | ................... | 382/128 |
| 2004/0056981 A1 | 3/2004 | Hamamura et al. | | |
| 2006/0143652 A1 | 6/2006 | Chung | | |
| 2007/0050813 A1 | 3/2007 | Lee | | |
| 2007/0110399 A1 | 5/2007 | Roh | | |
| 2008/0129728 A1 | 6/2008 | Satoshi | | |
| 2008/0129757 A1 | 6/2008 | Tanaka et al. | | |
| 2008/0134096 A1 * | 6/2008 | Satoshi | ................... | 715/838 |
| 2010/0083316 A1 * | 4/2010 | Togashi et al. | ................... | 725/41 |
| 2012/0062711 A1 * | 3/2012 | Ikeda et al. | ................... | 348/51 |

FOREIGN PATENT DOCUMENTS

| | | |
|---|---|---|
| CN | 1497987 A | 5/2004 |
| CN | 1812555 A | 8/2006 |
| CN | 1910577 A | 2/2007 |
| CN | 1925599 A | 3/2007 |
| CN | 1968416 A | 5/2007 |
| CN | 101031040 A | 9/2007 |
| CN | 101296386 A | 10/2008 |

* cited by examiner

*Primary Examiner* — Daquan Zhao
(74) *Attorney, Agent, or Firm* — Birch, Stewart, Kolasch & Birch, LLP

(57) ABSTRACT

A 3D-image providing device comprises: an index selection unit for selecting at least one index frame set from 3D-image data including plural frame sets; and a thumbnail generation unit for obtaining left and right images for the selected index frame set and generating a thumbnail frame set based on the obtained left and right images, wherein the frames included in the thumbnail frame set satisfy conditions that the sizes and resolution thereof are respectively small and low compared to the frames included in the index frame set. Accordingly, the 3D-image providing device generates 3D-thumbnails from the left and right images of the 3D-image data to provide 3D images considered when moving to a user-desirable reproduction time point. Also, the 3D-image supply device merges the 3D-thumbnails with 3D-broadcasting images or 3D-contents and displays the merged image. Consequently, the image providing device minimizes viewer confusion when perceiving 3D-images and increases user satisfaction.

19 Claims, 4 Drawing Sheets

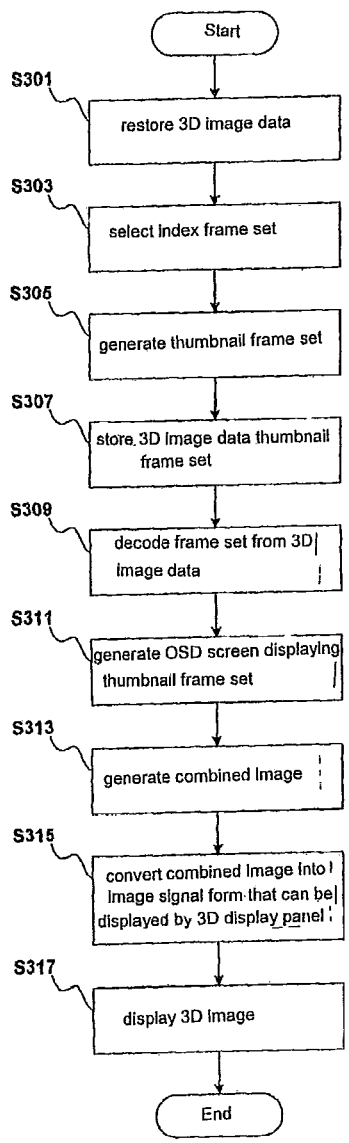

3D IMAGE PROVIDING DEVICE, DISPLAY DEVICE, AND METHOD THEREOF

CROSS REFERENCE TO RELATED APPLICATIONS

This application is the National Phase of PCT/KR2010/000857 filed on Feb. 11, 2010, which claims priority under 35 U.S.C. 119(e) to U.S. Provisional Application No. 61/219,398 filed on Jun. 23, 2009, all of which are hereby expressly incorporated by reference into the present application.

FIELD OF THE INVENTION

The present invention relates to an image providing device, a display device, and a method thereof, and more particularly, to a 3D image providing device, a display device, and a method thereof.

DISCUSSION OF THE BACKGROUND

In general, a related art stereoscopic three-dimensional (3D) display device provides 3D images allowing for a depth perception or stereovision to users.

SUMMARY OF THE INVENTION

A technical issue of the present invention is to provide a 3D image providing device and a method thereof capable of generating a 3D thumbnail from 3D image data.

Another technical issue of the present invention is to provide a 3D image display device and a method thereof capable of naturally merging a 3D thumbnail and a 3D main image and displaying the merged image.

In order to solve the technical issues of the present invention, a 3D image providing device according to an embodiment of the present invention includes: an index selection unit for selecting at least one index frame set from 3D image data including plural frame sets; and a thumbnail generation unit for obtaining left and right images for the selected index frame set and generating a thumbnail frame set on the basis of the obtained left and right images, wherein the frames included in the thumbnail frame set satisfy conditions that the sizes thereof and the resolution thereof are respectively small and low compared to the frames included in the index frame set.

The frame set, the index frame set, and the thumbnail frame set may include at least one frame constituting a 3D image at a particular time.

The index selection unit may select the index frame set at a predetermined time period or at a predetermined frame period.

The index selection unit may select a left image frame and a right image frame together constituting a time sequential type stereoscopic image.

The index selection unit may select one frame constituting a non-time sequential type stereoscopic image.

The thumbnail generation unit may obtain a left image frame and a right image frame with respect to the index frame set in the time sequential type stereoscopic image, downscale the obtained left image frame and the right image frame, and generate the thumbnail frame set based on the downscaled left image frame and the downscaled right image frame.

The thumbnail generation unit may obtain a left image from a portion of the frame included in the index frame set in the non-time sequential type stereoscopic image, obtain a right image from the other remaining portions of the frame, downscale the obtained left and right images, and combine the downscaled left image frame and the downscaled right image frame to generate the thumbnail frame set.

The 3D image providing device may further include: a storage unit for storing the 3D image data and the thumbnail frame set; an image decoding unit for restoring the frame set from the stored 3D image data; an on-screen display (OSD) generation unit for selecting at least one of the stored thumbnail frame sets, and generating an OSD screen displaying the selected thumbnail frame set; and an image combining unit for generating a combined image based on the frame set restored by the image decoding unit and the OSD screen generated by the OSD generation unit.

The image decoding unit may decode the frame set from a 3D broadcast signal, 3D contents data provided from an external device, or the 3D image data stored in the storage unit.

The index selection unit may select the index frame set from the 3D image data restored by the image decoding unit.

The OSD generation unit may select the thumbnail frame set based on the entire reproduction time or a total of frame numbers of the 3D image data stored in the storage unit.

The image combining unit may combine a left image of the frame set decoded by the image decoding unit and a left image of the OSD screen generated by the OSD generation unit, and combine a right image of the frame set decoded by the image decoding unit and a right image of the OSD screen generated by the OSD generation unit.

The 3D image providing device may further include: a 3D formatter for converting the combined image into a form of an image signal that can be displayed by a 3D display panel.

In order to solve a technical issue of the present invention, a 3D image display device according to an embodiment of the present invention includes: a display unit displaying a 3D image; a storage unit storing 3D image data and at least one thumbnail frame set; a first image providing unit restoring the 3D image data from a received broadcast signal, and obtaining at least one frame set from the 3D image data stored in the storage unit; a second image providing unit selecting at least one index frame set from the restored 3D image data, generating a thumbnail frame set corresponding to the selected index frame set, and storing the generated thumbnail frame set in the storage unit; and an image signal output unit generating a combined image based on the frame set obtained by the first image providing unit and the thumbnail frame set generated by the second image providing unit, and providing an image signal obtained by 3D formatting the combined image to the display unit, wherein the frames included in the thumbnail frame set satisfy conditions that the sizes thereof and the resolution thereof are respectively small and low compared to the frames included in the index frame set.

The display unit may simultaneously display a video configured by the frame set and a still image configured by the thumbnail frame set.

In order to solve a technical issue of the present invention, a 3D image providing method according to an embodiment of the present invention includes: selecting at least one index frame set from 3D image data including a plurality of frame sets; obtaining a left image and a right image from a selected index frame set; and generating a thumbnail frame set based on the obtained left image and the obtained right image, wherein the frames included in the thumbnail frame set satisfy conditions that the sizes thereof and the resolution thereof are respectively small and low compared to the frames included in the index frame set.

The frame set, the index frame set, and the thumbnail frame set may include at least one frame constituting a 3D image at a particular time.

The method may further include: restoring the 3D image data including the plurality of frame sets from a 3D broadcast signal; storing the 3D image data and the thumbnail frame set; generating an OSD screen displaying at least one of the stored thumbnail frame sets; and generating a combined image based on the frame set obtained from the 3D image data and the OSD screen.

In order to solve a technical issue of the present invention, a 3D image display method according to an embodiment of the present invention includes: restoring 3D image data including at least one frame set from a broadcast signal; selecting at least one index frame set from the 3D image data; generating a thumbnail frame set corresponding to the index frame set; storing the 3D image data and the thumbnail frame set; generating an OSD screen displaying at least one of the stored thumbnail frame set; generating a combined image based on the frame set obtained from the 3D image data and the OSD screen; and outputting an image signal obtained by 3D formatting the combined image.

In generating the combined image, a left image of the frame set and a left image of the OSD screen may be combined, and a right image of the frame set and a right image of the OSD screen may be combined.

According to the 3D image providing device, the display device, and the method thereof, 3D thumbnails are generated from the left and right images of the 3D image data obtained from 3D image data, thus providing 3D images that can be considered for the migration to a user-desirable reproduction point.

In addition, the 3D thumbnails can be naturally merged with a 3D broadcasting image or 3D content image and displayed. Consequently, a viewer's confusion in the process of perceiving a 3D image can be minimized and user satisfaction for viewing 3D images can be increased.

BRIEF DESCRIPTION OF THE DRAWINGS

FIG. 7 is a flow chart illustrating the process of a 3D image display method according to an embodiment of the present invention.

DESCRIPTION OF THE EMBODIMENTS OF THE INVENTION

Figure 1:
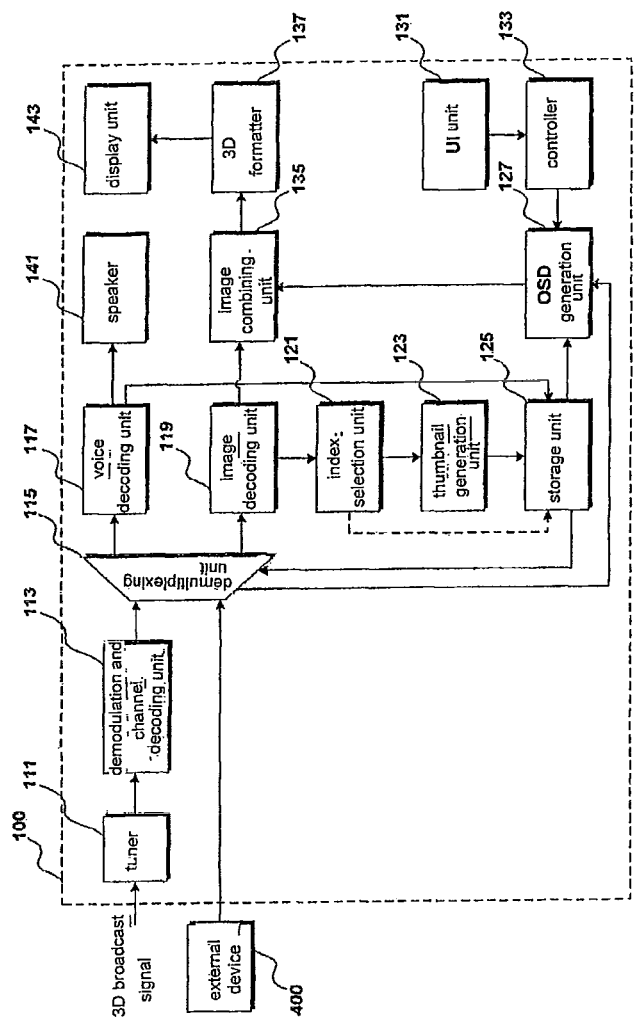
FIG. 1 is a block diagram showing the configuration of a three-dimensional (3D) image display device according to an embodiment of the present invention.

Hereinafter, embodiments of a 3D image providing device, a display device, and a method thereof capable of generating a 3D thumbnail and naturally merging the 3D thumbnail with a 3D main image to display a merged image, thus increasing user satisfaction of the 3D image will be described in detail with reference to FIGS. 1 to 7.

To begin with, concepts or terms required to explain some embodiments of the present invention will be described.

Configuration of Stereoscopic Image

A stereoscopic image is composed of a left image (or an image for the left eye) and a right image (or an image for the right eye). Schemes for configuring a stereoscopic image include a top-down scheme in which the left image and the right image are disposed in a top-down manner in one frame, an L-to-R (left-to-right or side-by-side) scheme in which the left image and the right image are disposed horizontally in one frame, a checker board scheme in which fragments of the left image and the right image are disposed in a tile format, an interlaced scheme in which the left image and the right image are alternately disposed by column or row, and a time sequential (or frame-by-frame) scheme in which the left image and the right image are alternately displayed according to time. Thus, one stereoscopic scene (image) includes two frames in case of the time sequential scheme and includes one frame in case of schemes other than the time sequential scheme.

Frame Set

A frame set includes at least one frame constituting a stereoscopic image at a particular time. For example, in case of the time sequential scheme, a frame set includes a left image frame and a right image frame, and in case of schemes other than the time sequential scheme, a frame set may include a single image frame obtained by combining a left image and a right image.

Index

A frame set, which is, in particular, to be used as an index, may be selected from a plurality of frame sets constituting an image. The index refers to an index with respect to a particular time of an entire reproduction time, or an index with respect to a particular frame set corresponding to the particular time. The index may be determined according to a user selection, or may be determined according to a predetermined automated method. For example, when the user records a broadcast program by using a personal video recording (PVR) function, and when the user wants to view the recorded broadcast program, the user may immediately migrate the reproduction time point to the previously determined index point.

Thumbnail

In general, a thumbnail refers to a downscaled moving image or a downscaled still image. In particular, in one embodiment, a thumbnail or a thumbnail frame set may be understood as a frame set including downscaled image frames. The thumbnail frame has a small size or low resolution in comparison to the original frame. For example, a thumbnail frame set may be generated with respect to an index frame set.

When a video signal has been coded according to a Moving Picture Experts Group (MPEG) technique, a thumbnail may be created from an intra-picture (i-picture) as a reference screen of a group of picture (GOP), which is a unit of random access.

FIG. 1 is a block diagram showing the configuration of a three-dimensional (3D) image display device according to an embodiment of the present invention. The 3D image display device 100 may display a 3D image corresponding to a 3D broadcast signal or 3D image data, in a stereoscopic manner, and may be implemented in various forms. For example, the 3D image display device 100 may include a 3D television, a 3D display device, or the like. After the 3D television receives 3D broadcast signals through a wired/wireless network such as terrestrial airwaves, a cable network, the Internet, mobile communications, satellite communications, or the like, or is provided with 3D contents data from a 3D Blu-Ray™ disk player, or the like, the 3D television may display 3D images corresponding to the received 3D broadcast signals or the provided 3D contents data, in a stereoscopic manner, and outputs sounds corresponding thereto.

As shown in FIG. 1, the 3D image display device 100 may include a tuner 111, a demodulation and channel decoding unit 113, a demultiplexing unit 115, a voice decoding unit 117, an image decoding unit 119, an index selection unit 121, a thumbnail generation unit 123, a storage unit 125, an on-screen display (OSD) generation unit 127, a UI unit 131, a controller 133, an image combining unit 135, a 3D formatter 137, a speaker 141, a display unit 143, and the like. The constituents of the 3D image display device 100 illustrated in FIG. 1 are not all essential; namely, the 3D image display device 100 may be implemented by greater or fewer constituents.

The tuner 111 may select a broadcast signal of one channel among a plurality of broadcast signals, and output the same.

The demodulation and channel decoding unit 113 demodulates the broadcast signal from the tuner 111 and performs error-correction decoding on the demodulated signal to output a transport stream (TS). The demodulation and channel decoding unit 113 may include an analog-to-digital converter (ADC) for outputting the TS.

The transport demultiplexing unit 115 demultiplexes the TS to separate a video packetized elementary stream (PES) and an audio PES. In addition, the transport demultiplexing unit 115 may extract program specific information/program and system information protocol (PSI/PSIP) information. A depacketizing unit (not shown) performs depacketization on the video PES and the audio PES to restore a video elementary stream (ES) and an audio ES. A PSI/PSIP processing unit (not shown) receives the PSI/PSIP information from the transport demultiplexing unit 115, parses the same, and stores the parsed PSIP/PSIP information in a memory or register, so that broadcast signal decoding and broadcast reproducing can be performed based on the stored information.

The transport demultiplexing unit 115 may be provided with the 3D image data and a transport stream (TS) including a thumbnail previously generated for the 3D image data from an external device 400 such as a 3D Blu-Ray™ disk player, or the like. In this case, the transport demultiplexing unit 115 processes the 3D image data in the same manner as that for the 3D broadcast signal, and provides a restored thumbnail to the OSD generation unit 127. Other 3D image display processing can be understood in the same manner as that for the 3D broadcast signal, so a detailed description thereof will be omitted merely for the sake of brevity.

The voice decoding unit 117 decodes the audio ES and outputs an audio bit stream. The audio bit stream may be converted into an analog voice signal by a digital-to-analog converter (ADC) (not shown), amplified by an amplifier (not shown), and then output through the speaker 141. The voice decoding unit 117 may directly store the audio bit steam in the storage unit 125, or although not shown in FIG. 1, the voice decoding unit 117 may store the audio bit stream in the storage unit 125 through the index selection unit 121 or the thumbnail generation unit 123.

The image decoding unit 119 may decode the video ES to restore a video bit stream. The restored video bit stream includes a left image signal and a right image signal constituting a stereoscopic 3D image.

The index selection unit 121 may select at least one index frame set from the video bit stream provided from the image decoding unit 119 according to a predetermined reference, and provides the selected index frame set to the thumbnail generation unit 123. The index selection unit 121 may provide the video bit stream to the thumbnail generation unit 123 or directly store the video bit stream in the storage unit 125.

Meanwhile, the index selection unit 121 may select an index frame set according to a predetermined period. The predetermined period may be a predetermined time interval or a predetermined frame interval. For example, when an updating frequency of a 3D image is 60 Hz (namely, when 60 frames are scanned per unit second), the index selection unit 121 may select one index frame set at every 30 Hz (namely, every $30^{th}$ frame set).

Or, when a contents provider provides some scene change information in addition to a 3D broadcast signal or 3D contents data, the index selection unit 121 may select an index frame set corresponding to a scene change (time) point. For example, when chapter information is provided along with a 3D broadcast signal, the index selection unit 121 may select an index frame set corresponding to a start time point of each chapter.

Or, in case the entire reproduction time information is provided along with a 3D broadcast signal, when the entire reproduction time is divided into a predetermined number, the index selection unit 121 may select an index frame set corresponding to each divided time point. For example, in case the entire reproduction time of an image is determined to be 2 hours, when the entire reproduction time is divided into eight equal parts, the index selection unit 121 may select an index frame set corresponding to each divided time point, i.e., 0 minute, 15 minutes, 30 minutes, 45 minutes, 60 minutes, 75 minutes, 90 minutes, 105 minutes, and 120 minutes.

Meanwhile, when the scheme constituting the stereoscopic image is a time sequential scheme, the index selection unit 121 may select two frames, i.e., a left image frame and a right image frame, constituting a stereoscopic image of an indexing point. When the scheme constituting the stereoscopic image is not a time sequential scheme, the index selection unit 121 may select one frame, i.e., a combined frame of a left image and a right image, constituting the stereoscopic image of the indexing point.

The thumbnail generation unit 123 generates thumbnails (or a thumbnail frame set) with respect to the index frame set provided from the index selection unit 121 and stores the generated thumbnails in the storage unit 125. When the index section unit 121 provides a video bit stream, the thumbnail generation unit 123 may store the video bit stream in the storage unit 125.

In particular, the thumbnail generation unit 123 obtains a left image and a right image with respect to the provided index frame set, and generates a thumbnail frame set based on the obtained left image and the right image.

For example, when a scheme of constituting a stereoscopic image is an L-to-R scheme, the thumbnail generation unit 123 may obtain a left image from a left half of one frame included in the index frame set and a right image from a right half thereof, downscale the obtained left image and the right image, and combine the downscaled left image and right image into one frame based on the L-to-R scheme to generate a thumbnail frame set.

Also, when a scheme of constituting a stereoscopic image is a time sequential scheme, the thumbnail generation unit 123 may obtain left images from left image frames of two frames included in the index frame set, obtain right images from the right image frames, downscale the left images and the right images, and constitute the downscaled left and right images into two left and right frames based on the time sequential scheme to generate a thumbnail frame set.

Meanwhile, the thumbnail generation unit 123 may simply downscale the frames included in the index frame set to generate a thumbnail frame set. In particular, according to such a simple downscaling method, the picture quality of a generated thumbnail may be degraded in comparison to the foregoing reconfiguration scheme, but the simple downscaling method may be selectively used to enhance a thumbnail processing speed.

The storage unit 125 stores a video bit stream, a corresponding audio bit stream, and a thumbnail frame set. The storage unit 125 may include a computer-readable medium such as a random access memory (RAM), a read only memory (ROM), a hard disk drive, an optical drive, a flash memory, or the like.

Meanwhile, a video bit stream and an audio bit stream may be encoded according to a predetermined format and stored in the storage unit 125. For example, the video bit stream and the audio bit stream may be stored as separate files in the storage unit 125. Or, the video bit stream and the audio bit stream may be stored in the form of a TS file. In this case, as shown in FIG. 1, the transport demultiplexing unit 115 demultiplexes the TS stored in the storage unit 125 to separate the video PES and the audio PES. And, when the depacketizer (not shown) depacketizes the video PES and the audio PES to restore the video ES and the audio ES, the image decoding unit 119 and the voice decoding unit 117 decodes the video ES and the audio ES, respectively, and output the video bit stream and the audio bit stream to the image combining unit 135, and the speaker 141.

The OSD generation unit 127 generates an OSD screen that displays information which is required by the user or should be known by the user. The OSD screen may be displayed on a main image. The OSD screen may entirely be a 3D screen or a portion of the OSD screen may be a 3D screen. For example, the OSD generation unit 127 may generate a screen including a 2D screen object such as information regarding an input source, a channel number, a program title, a reproduction time, a subtitle, a main voice, or a stereo/mono output, a progress bar indicating an whole reproduction time and a current reproduction point, or a 3D screen object such as a 3D thumbnail, or the like.

The OSD generation unit 127 may select a certain number of thumbnail frame sets from among a plurality of thumbnail frame sets stored in the storage unit 125, and generate an OSD screen displaying the selected thumbnail frame sets. In particular, the OSD generation unit 127 may recognize the total reproduction time of the video bit stream stored in the storage unit 125 and select a thumbnail frame set corresponding to a time point obtained by appropriately dividing the total reproduction time. For example, the OSD generation unit 127 may appropriately dispose the thumbnail frame set corresponding to each reproduction time point at a lower end of the progress bar on the OSD screen.

The process of generating an OSD screen including a thumbnail frame set will be described in more detail. For example, when the index selection unit 121 selects an index frame set corresponding to a point in time whenever one minute has lapsed, the thumbnail generation unit 123 may generate a thumbnail frame set with respect to each index frame set at every one minute. When a given total reproduction time of a 3D image is two hours, a total of 120 thumbnail frame sets may be generated and stored in the storage unit 125. When it is determined that the 3D image display device displays seven thumbnails on a screen according to a user selection or according to a predetermining setting, the OSD generation unit 127 may select the $15^{th}$, $30^{th}$, $45^{th}$, $60^{th}$, $75^{th}$, $90^{th}$, and $105^{th}$ thumbnail frame sets from among the total of 120 thumbnail frame sets, and generate an OSD screen displaying the selected seven thumbnail frame sets.

The user interface (UI) unit 131 provides various manipulation commands or information input by the user to the controller 133 as explained hereinafter. The UI unit 131 may include an infra-red (IR) reception unit for receiving infrared signals transmitted from a remote controller, a keypad provided on a front face or a lateral face of the 3D image display device 100, a radio frequency (RF) reception unit for receiving a radio signal transmitted from a pointing device that supports an operation of moving a point on the screen and selecting a point at which the pointer is placed, and the like. For example, when the UI unit 131 includes an RF reception unit, the user may move the reproduction time point to a corresponding scene by performing an inputting operation of selecting a particular time point on a thumbnail or the progress bar by using the pointing device.

The controller 133 may control an overall operation of the 3D image display device 100. The controller 133 may receive a user input signal from the UI unit 131 and generate a control signal for controlling an operation of the 3D image display device 100 in response to the user input signal.

For example, although not shown in FIG. 1, when the user performs an inputting operation of clicking a particular point on a thumbnail constituting an OSD screen or the progress bar, the UI unit 131 may transfer coordinate information and click information of the point in the form of an electrical signal to the controller 133. Then, the controller 133 may determine the clicked reproduction time point based on the coordinate information and the click information, and transmits a control command to the image decoding unit 119 and the voice decoding unit 117. Or, when the user changes the information to be displayed on the OSD screen, the controller 133 may transmit a control command to the OSD generation unit 127 so that the OSD screen can be updated or corrected.

The controller 133 and the OSD generation unit 127 may be implemented as a single block or a single element for generating an OSD screen and controlling the overall operation of the 3D image display device 100. For example, the controller 133 and the OSD generation unit 127 may be implemented as a single microprocessor.

The image combining unit 135 receives a left image signal and a right image signal of a video bit stream (main image) from the image decoding unit 119. Also, the image combining unit 135 receives a left image signal and a right image signal of an OSD screen from the OSD generation unit 127. The image combining unit 131 combines the left image signal and the right image signal of the video bit stream and the left image signal and the right image signal of the OSD screen to generate a combined image.

The video bit stream provided by the image decoding unit 119 to the image combining unit 135 may be a bit stream which has been restored from 3D contents data provided from an external device such as a 3D Blu-Ray™ disk player, or the like, or 3D broadcast image data recorded in the storage unit 125. The video bit stream includes the left image signal and the right image signal with respect to the main image. The OSD screen provided by the OSD generation unit 127 to the image combining unit 135 is comprised of the left image signal and the right image signal, whereby the 3D thumbnail can be properly displayed.

Meanwhile, the image combining unit 135 may combine the left image signal of the video bit stream (main image) and the left image signal of the OSD screen and combine the right image signal of the video bit stream and the right image signal of the OSD screen to generate a combined image. Here, the image combining unit 135 may display the OSD screen on the main image by using video overlay, hardware overlay, or the like.

The 3D formatter 137 converts the combined image into a 3D image signal form that can be displayed by a 3D display panel. For example, when the format of the combined image is a top-down scheme and a 3D display panel provided in the 3D image display device 100 according to an embodiment of the present invention supports only a time sequential scheme, the 3D formatter 137 may convert the combined image based on the top-down scheme into a combined image based on the time sequential scheme. In this case, the 3D formatter 137 may convert a left image positioned at an upper end of the combined image into a left image frame and a right image positioned at a lower end into a right image frame.

An image signal separating unit (not shown) may separate image data and a synchronization signal from the 3D image signal. The image data is information regarding brightness, chroma, and color of each pixel on a screen, which may be configured according to an image format such as RGB, CMY, YCbCr, YIQ, HIS, or the like. The synchronization signal, which is information allowing the image data to be normally displayed as a target image without distortions (e.g. image shake up or breaking) on the screen, may include a vertical synchronization signal (VSYNC), a horizontal synchronization signal (HSYNC), a pixel clock, a dot clock, or the like.

The display unit 143 includes a panel and a panel driving circuit for converting left and right image signals to be appropriately displayed on the panel and generating control signals such as various timing control signals, driving signals, and the like. The display unit 143 may simultaneously display a video configured by a video bit stream (main image) and a still image configured by an OSC screen on the panel.

Meanwhile, the display unit 143 may include at least one of a liquid crystal display (LCD), a plasma display panel, a thin film transistor-liquid crystal display, an organic light-emitting diode, a field emission display, and a flexible display.

Also, two or more display units 230 may be provided according to an implementation of the 3D image display device 100. For example, both an upper display unit (not shown) and a lower display unit (not shown) may be provided to the 3D image display device 100.

Also, the display unit 143 may display 3D images according to a polarization scheme or a time-division scheme as a 3D image display scheme. The display unit 135 based on the polarization scheme may additionally include a polarization film or a polarizer. The display unit 135 based on the time-division scheme may additionally include a synchronization signal generator such as an emitter, or the like, for synchronizing left and right images with shuttered glasses worn by the viewer.

The polarizer operates to pass light only in a particular polarization direction from the light emitted from the display unit 135 to allow the entirety of the transmitted light to have the same polarization direction. The polarizer may include at least one of an iodine polarization film, a dye-based polarization film, a phase polarization film, a translucent polarization film, a high reflective translucent polarization film, an anti-glare/anti-reflection film, a reflective polarization film, and a liquid crystal (LC) film. The polarizer is able to change a polarization direction into a particular direction according to an electrical control signal. For example, the polarizer may change into a polarization direction of −45° and a polarization direction of +45°, and in this case, light having the polarization direction of −45° and light having the polarization direction of +45° are alternately transmitted through the polarizer.

The functions of the respective components applied to the device 100 for providing a 3D PIP image can be implemented in a computer-readable recording medium by using software, hardware, or a combination thereof. For hardware implementation, the data transmission apparatus according to an embodiment of the present invention described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic units, or a combination thereof. For software implementation, the data transmission apparatus according to an embodiment of the present invention may be implemented by at least one software module performing the foregoing functions or operations. Each software module may be implemented by software codes written in any suitable programming language. The software codes may be stored in a memory (not shown) and executed by a processor (not shown).

The 3D image display device according to embodiments of the present invention has been described, but some of the elements of the 3D image display device according to some embodiments may constitute an independent 3D image providing device, by themselves.

For example, the tuner 111, the demodulation and channel decoding unit 113, the demultiplexing unit 115, the voice decoding unit 117, the image decoding unit 119, the index selection unit 121, the thumbnail generation unit 123, the storage unit 125, the on-screen display (OSD) generation unit 127, the UI unit 131, the controller 133, the image combining unit 135, and the 3D formatter 137 may constitute a 3D image providing device by themselves. The 3D image providing device may be implemented in the form of a PVR device of a 3D broadcast image, a 3D broadcast set-top box supporting a PVR function, and the like.

Or, for example, the index selection unit 121 and the thumbnail generation unit 123 may constitute an independent 3D image providing device by themselves. The 3D image providing device may be mounted in a 3D television receiver, or the like, so as to be implemented in the form of a digital processing element generating a 3D thumbnail from a 3D image source.

FIGS. 2 to 6 are conceptual views explaining an operation of the 3D image display device according to an embodiment of the present invention. Hereinafter, for the sake of explanation, it is assumed that a 3D image is configured according to an L-to-R scheme, and thus, an index frame set includes one frame.

Figure 2:
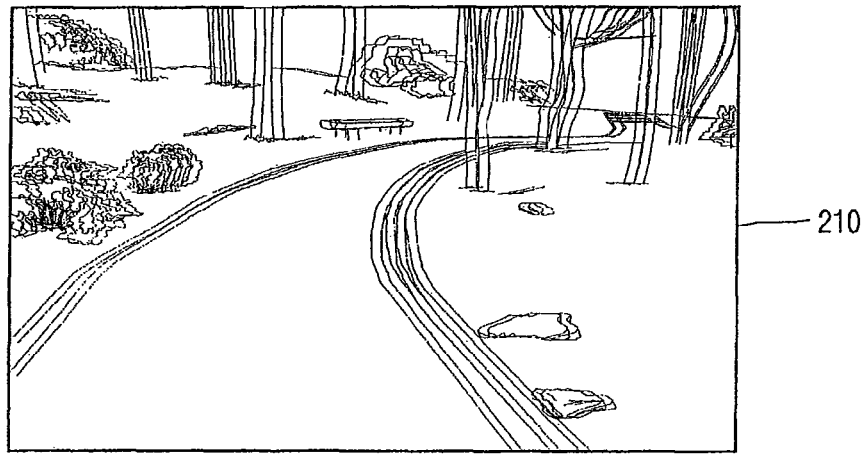
FIGS. 2 to 6 are conceptual views explaining an operation of the 3D image display device according to an embodiment of the present invention.

FIG. 2 shows a screen example of a case in which an index frame set 210 selected by the index selection unit 121 is displayed on a display screen.

Figure 3:
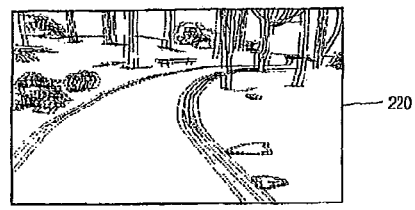

FIG. 3 shows a screen example of a case in which a thumbnail frame set 220 generated by the thumbnail generation unit 123 from the index frame set 210 is displayed on the display screen. It is noted that the thumbnail frame set 220 has a small frame size or low frame resolution in comparison to the index frame set 210 of FIG. 2.

Figure 4:
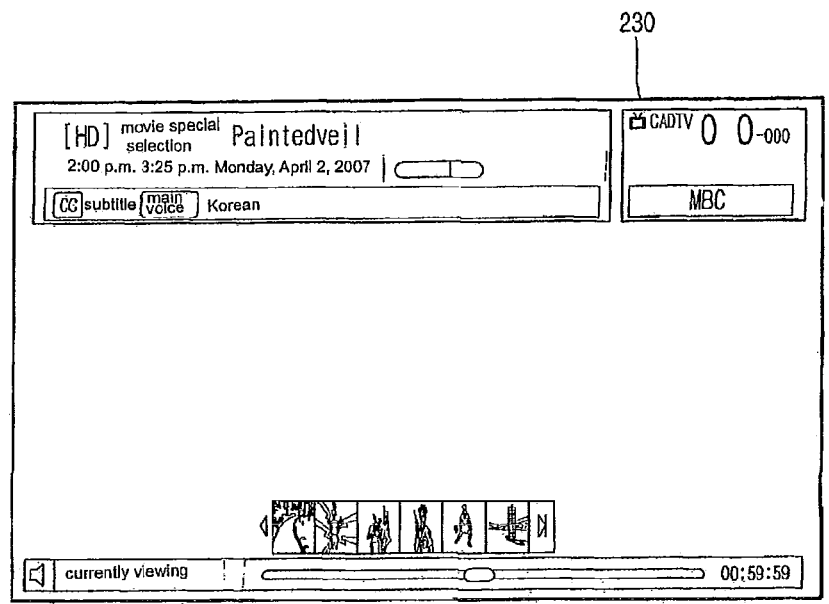

FIG. 4 shows a screen example of a case in which an OSD screen 230 generated by the OSD generation unit 127 is displayed on the display screen. It is noted that program information as a 2D screen object, a progress bar, or the like, and a thumbnail, a 3D screen object, are displayed on the OSD screen.

Figure 5:
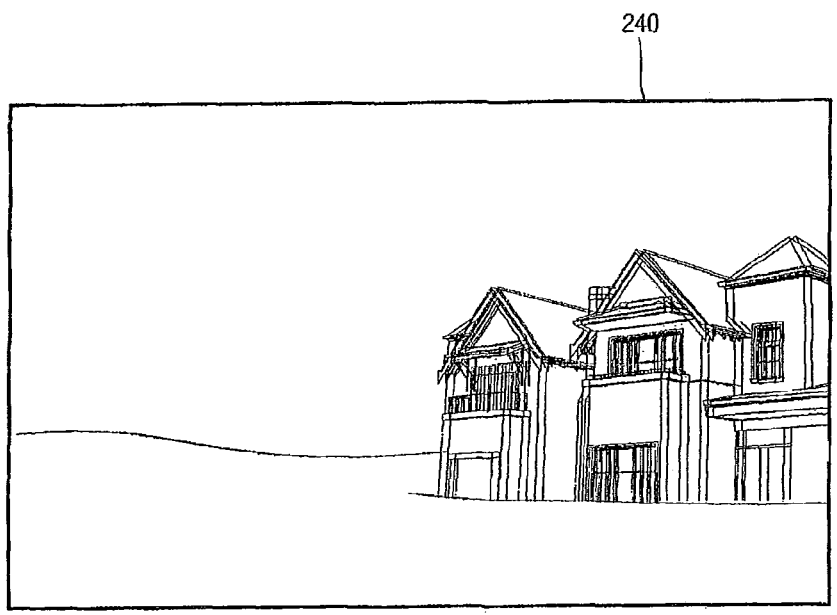

FIG. 5 shows a screen example of a case in which a main image (video bit stream 240) restored by the image decoding unit 119 is displayed on the display screen.

Figure 6:
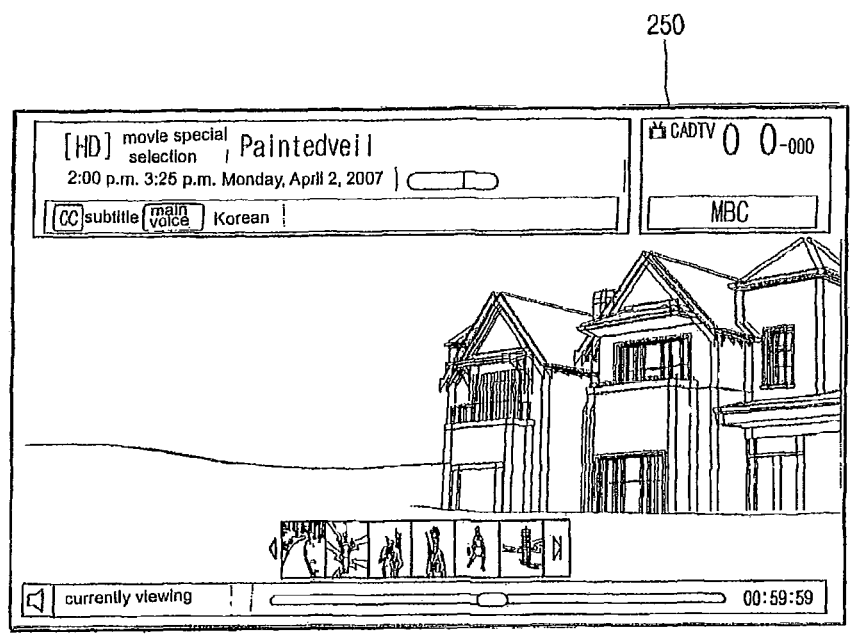

FIG. 6 shows a screen example of a case in which a screen image 250 of the main image (video bit stream 240) and the OSD screen 230 combined by the image combining unit 135 is displayed on the display screen.

FIG. 7 is a flow chart illustrating the process of a 3D image display method according to an embodiment of the present invention. All of the constituent components of the 3D image display method illustrated in FIG. 7 are not essential, and the 3D image display method may be implemented by greater or fewer components.

With reference to FIG. 7, first, a 3D broadcast signal received through a wired/wireless network, or the like, 3D contents data provided from an external device such as a 3D Blu-Ray™ disk player, or the like, or 3D broadcast image data recorded in the storage unit 125, and the like, are decoded to restore 3D image data (3D image stream) (S301). At least one index frame set among the plurality of frame sets included in the 3D image data is selected according to a predetermined reference (S303).

Next, a thumbnail frame set is generated with respect to the selected index frame set (S305). Here, a left image and a right image may be obtained with respect to the selected index frame set, and a thumbnail frame set may be generated based on the obtained left image and the right image.

And, the 3D image data and the thumbnail frame set are stored (S307). Next, the frame set is decoded from the stored 3D image data (S309). An OSD screen displaying at least one of the stored thumbnail frame sets is generated (S311).

Thereafter, a combined image is generated based on the frame set and the OSD screen (S313). Here, the left image of the frame set and the right image of the OSD screen may be combined and the right image of the frame set and the right image of the OSD screen may be combined to generate the combined image.

The combined image is converted (i.e. 3D-formatted) into an image signal form that can be displayed by the 3D display panel (S315). Finally, a 3D image corresponding to the image signal is displayed on the 3D display panel (S317).

A 3D image display method according to some embodiments can be understood in a similar manner to that of the 3D image display device according to the embodiments as described above with reference to FIGS. 1 through 6, so a description thereof will be omitted merely for the sake of brevity.

The 3D image display method according to certain embodiments has been described, but some of the constituent components of the 3D image display method may constitute an independent 3D image providing method by themselves.

For example, steps S310 to S315 may constitute an independent 3D image providing method by themselves. The 3D image providing method may be implemented in the form of a 3D image providing method performed by a PVR device of a 3D broadcast image, a 3D broadcast set-top box supporting a PVR function, and the like.

Also, for example, steps S303 to S305 may be configured as an independent 3D image providing method by themselves. The 3D image providing method may be implemented in the form of a 3D image providing method performed by a digital processing element which is mounted in a 3D television receiver, or the like, and generates a 3D thumbnail from a 3D image source.

The exemplary embodiments are described with reference to the accompanying drawings, in which like numbers refer to like elements throughout. In describing these embodiments, if a detailed explanation for a related known function or construction is considered to unnecessarily divert the gist of the invention, such explanation has been omitted but would be understood by those skilled in the art. The accompanying drawings aim to facilitate understanding of the exemplary embodiments, and should not be construed as being limited to the details depicted therein. The technical idea of the exemplary embodiments should be interpreted to embrace all such alterations, modifications, and variations in addition to the accompanying drawings.

The invention claimed is:

1. A three-dimensional (3D) image providing device comprising:
an index selection unit configured to select at least one index frame set from 3D image data including plural frame sets;
a thumbnail generation unit configured to obtain left and right images for the selected index frame set and generate a thumbnail frame set on the basis of the obtained left and right images;
a storage unit configured to store the 3D image data and the generated thumbnail frame set;
an image decoding unit configured to restore the frame set selected from the stored 3D image data;
an on-screen display (OSD) generation unit configured to select at least one of the stored thumbnail frame set, and generate an OSD screen displaying the selected thumbnail frame set; and
an image combining unit configured to generate a combined image based on the frame set restored by the image decoding unit and the OSD screen generated by the OSD generation unit,
wherein the OSD generation unit is further configured to:
recognize a total reproduction time of the stored 3D image data, and
select a stored thumbnail frame set corresponding to a time point obtained by dividing the total reproduction time based on a user selection or according to a predetermining setting.

2. The 3D image providing device of claim 1, wherein the frame set, the index frame set, and the thumbnail frame set include at least one frame constituting a 3D image at a particular time.

3. The 3D image providing device of claim 1, wherein the index selection unit selects the index frame set at a predetermined time period or at a predetermined frame period.

4. The 3D image providing device of claim 1, wherein the index selection unit selects a left image frame and a right image frame together constituting a time sequential type stereoscopic image.

5. The 3D image providing device of claim 1, wherein the index selection unit selects one frame constituting a non-time sequential type stereoscopic image.

6. The 3D image providing device of claim 1, wherein the thumbnail generation unit obtains a left image frame and a right image frame with respect to the index frame set in a time sequential type stereoscopic image, downscales the obtained left image frame and the right image frame, and generates the thumbnail frame set based on the downscaled left image frame and the downscaled right image frame.

7. The 3D image providing device of claim 1, wherein the thumbnail generation unit obtains a left image from a portion of the frame included in the index frame set in a non-time sequential type stereoscopic image, obtains a right image from other remaining portions of the frame, downscales the obtained left and right images, and combines the downscaled left image frame and the downscaled right image frame to generate the thumbnail frame set.

8. The 3D image providing device of claim 1, wherein the image decoding unit decodes the frame set from a 3D broadcast signal, 3D contents data provided from an external device, or the 3D image data stored in the storage unit.

9. The 3D image providing device of claim 1, wherein the index selection unit selects the index frame set from the 3D image data restored by the image decoding unit.

10. The 3D image providing device of claim 1, wherein the OSD generation unit selects the thumbnail frame set based on a total of frame numbers of the 3D image data stored in the storage unit.

11. The 3D image providing device of claim 1, wherein the image combining unit combines a left image of the frame set decoded by the image decoding unit and a left image of the OSD screen generated by the OSD generation unit, and combines a right image of the frame set decoded by the image decoding unit and a right image of the OSD screen generated by the OSD generation unit.

12. The 3D image providing device of claim 1, further comprising:
   a 3D formatter configured to convert the combined image into a form of an image signal that can be displayed by a 3D display panel.

13. A three-dimensional (3D) image display device comprising:
   a display unit configured to display a 3D image;
   a storage unit configured to store 3D image data and at least one thumbnail frame set;
   a first image providing unit configured to restore the 3D image data from a received broadcast signal, and obtain at least one frame set from the 3D image data stored in the storage unit;
   a second image providing unit configured to select at least one index frame set from the restored 3D image data, generate a thumbnail frame set corresponding to the selected index frame set, and store the generated thumbnail frame set in the storage unit; and
   an image signal output unit configured to generate a combined image based on the frame set obtained by the first image providing unit and the thumbnail frame set generated by the second image providing unit, and provide an image signal obtained by 3D formatting the combined image to the display unit,
   wherein the second image providing unit is further configured to recognize a total reproduction time of the stored 3D image data, and select a stored thumbnail frame set corresponding to a time point obtained by dividing the total reproduction time based on a user selection or according to a predetermining setting.

14. The 3D image display device of claim 13, wherein the display unit simultaneously displays a video configured by the frame set and a still image configured by the thumbnail frame set.

15. A three-dimensional (3D) image providing method comprising:
   selecting at least one index frame set from 3D image data including a plurality of frame sets;
   obtaining a left image and a right image from a selected index frame set;
   generating a thumbnail frame set based on the obtained left image and the obtained right image;
   restoring the 3D image data including the plurality of frame sets from a 3D broadcast signal;
   storing the 3D image data and the generated thumbnail frame set;
   generating an OSD screen displaying at least one of the stored thumbnail frame set; and
   generating a combined image based on the frame set obtained from the 3D image data and the OSD screen,
   wherein the generating the OSD screen further comprises:
   recognizing a total reproduction time of the stored 3D image data; and
   selecting a stored thumbnail frame set corresponding to a time point obtained by dividing the total reproduction time based on a user selection or according to a predetermined setting.

16. The 3D image providing method of claim 15, wherein the frame set, the index frame set, and the thumbnail frame set include at least one frame constituting a 3D image at a particular time.

17. The 3D image providing method of claim 15, further comprising:
   restoring the 3D image data including the plurality of frame sets from a 3D broadcast signal.

18. The 3D image providing method of claim 15, further comprising:
   outputting an image signal obtained by 3D formatting the combined image.

19. The 3D image providing method of claim 18, wherein when generating the combined image, a left image of the frame set and a left image of the OSD screen are combined, and a right image of the frame set and a right image of the OSD screen are combined.

* * * * *